Aug. 19, 1952         C. R. MAYO ET AL         2,607,443
                        SHOCK ABSORBER
Filed Jan. 22, 1949                        3 Sheets-Sheet 1

INVENTORS
CLYDE R. MAYO
and MORRIS KATCHER.
BY
Emanuel Scheyer
ATTORNEY

Aug. 19, 1952 — C. R. MAYO ET AL — 2,607,443
SHOCK ABSORBER
Filed Jan. 22, 1949 — 3 Sheets-Sheet 2

INVENTORS
CLYDE R. MAYO
and MORRIS KATCHER.
BY Emanuel Scheyer
ATTORNEY

Patented Aug. 19, 1952

2,607,443

UNITED STATES PATENT OFFICE 2,607,443

SHOCK ABSORBER

Clyde R. Mayo, Fairfield, Ill., and Morris Katcher, New York, N. Y.; said Mayo assignor to said Katcher Application January 22, 1949, Serial No. 72,126

19 Claims. (Cl. 188—88)

This invention relates to hydraulic shock absorbers, particularly to the direct action fluid displacement type in which a cylinder structure and a piston structure are relatively reciprocable longitudinally or axially for displacement of fluid against flow resistance. In the use of such shock absorbers, as for example for damping purposes in automobiles, in airplane landing gears, or on guns for damping the recoil, efficient operation of the shock absorber requires that the space in which the piston operates be at all times kept filled with hydraulic fluid to the exclusion of air. Compensating means must be provided to compensate for increase or decrease of the volume of the fluid due to temperature changes and also to compensate for displacement of hydraulic fluid by the volume of the piston rod as it enters or leaves the cylinder.

In the design of prior shock absorbers, complicated valving is required for expelling and admitting fluid to and from a reservoir as the piston rod moves in and out of the main cylinder. Such valving in some designs limits the operational characteristics. The uncontrolled flow of fluid to and from the reservoir tends to produce foam. If foam or air gets into the main or working cylinder, the operation of the unit is impaired, because foam or air in the cylinder acts as a cushion to prevent the building up of the desired damping pressures.

It is an object of the present invention to provide means for keeping the fluid in the main cylinder of the shock absorber under a relatively high pressure to prevent the entrance of air. This is accomplished by providing a compensating piston operating in an auxiliary or compensating cylinder, which compensating cylinder is in fluid communicating with the main cylinder. In one form of our shock absorber, the compensating piston and the compensating cylinder are in axial alignment with the main piston and main cylinder respectively. In another form the compensating piston and compensating cylinder are to one side of the main cylinder. In both forms the compensating cylinder is under relatively heavy spring pressure for forcing back into the main cylinder fluid present in the compensating cylinder. A further object of our invention is the prevention of the foaming usually caused in a shock absorber where the liquid is discharged or received from the main cylinder in accordance with the reciprocation of the piston rod into and out of the main cylinder. In our construction, liquid is forced out of the main cylinder as the piston rod enters it, the liquid forced out pushing back the compensating piston against the spring acting against the latter. Upon the withdrawal or outward motion of the piston rod, the compensating piston forces back the fluid which was previously forced out of the main cylinder. The spring pressure is strong enough, except for extremely violent jolts, to force fluid through valves provided in the main piston against the resistance of the flow of fluid through said valves.

When a jolt occurs which is violent enough to increase the resistance to flow of the fluid through the piston valves sufficiently to overcome the pressure of the compensating piston, the latter is forced back against the pressure of its spring providing thereby a maximum limit to the force that can be developed.

In our design the relative diameter of the main cylinder is large to that of the cross sectional area of the rod. As will become evident hereinafter, this is done to reduce the effect of pushing out the piston rod that is produced by the pressure of the compensating piston on the fluid in the main piston. The volume of fluid required to pass through the piston valves will be greater with a larger diameter cylinder. Increased volume of flow requires the larger fluid passages that are provided in our shock absorber. Larger passages are easier to manufacture and are less critical in tolerances.

A further object of our construction is a piston valve of simple design that opens in steps or to greater extent successively with resilient resistance as the pressure increases when the piston moves in the main cylinder. In the particular embodiment illustrated this takes place with movement of the piston outward of the main cylinder. The reverse could have been selected. Such a design permits wide variations in openings for the different pressures, and makes possible a wide range in both the magnitude and kind of the operating characteristics. The resistance of the flow of fluid through the valve means for outward movement of the piston relative to the resistance through the valve means for inward movement of the piston may be made greater or less. Said relative difference in resistance is provided in the construction of the valve means.

The form of shock absorber in which the compensating piston is in axial alignment with the main piston, under certain conditions, requires more room between the points of attachment at the ends of the shock absorber than is available on the vehicle. Under these conditions our construction is such that the compensating piston allows for the full overflow of fluid from the main cylinder, when the rod moves in, for only a limited motion of the compensating piston. After that, further overflow because of further inward motion of the rod escapes through a port directly into the reservoir. Where the compensating piston is to one side of the main cylinder, the motion of the compensating piston can readily be sufficient to provide for the full amount of overflow. However, even with the latter construction, an overflow port is provided but for another reason as will be explained.

Other objects and advantages will become apparent upon further study of the description and drawings in which.

Figures 6, 7, 8, 9, 10:
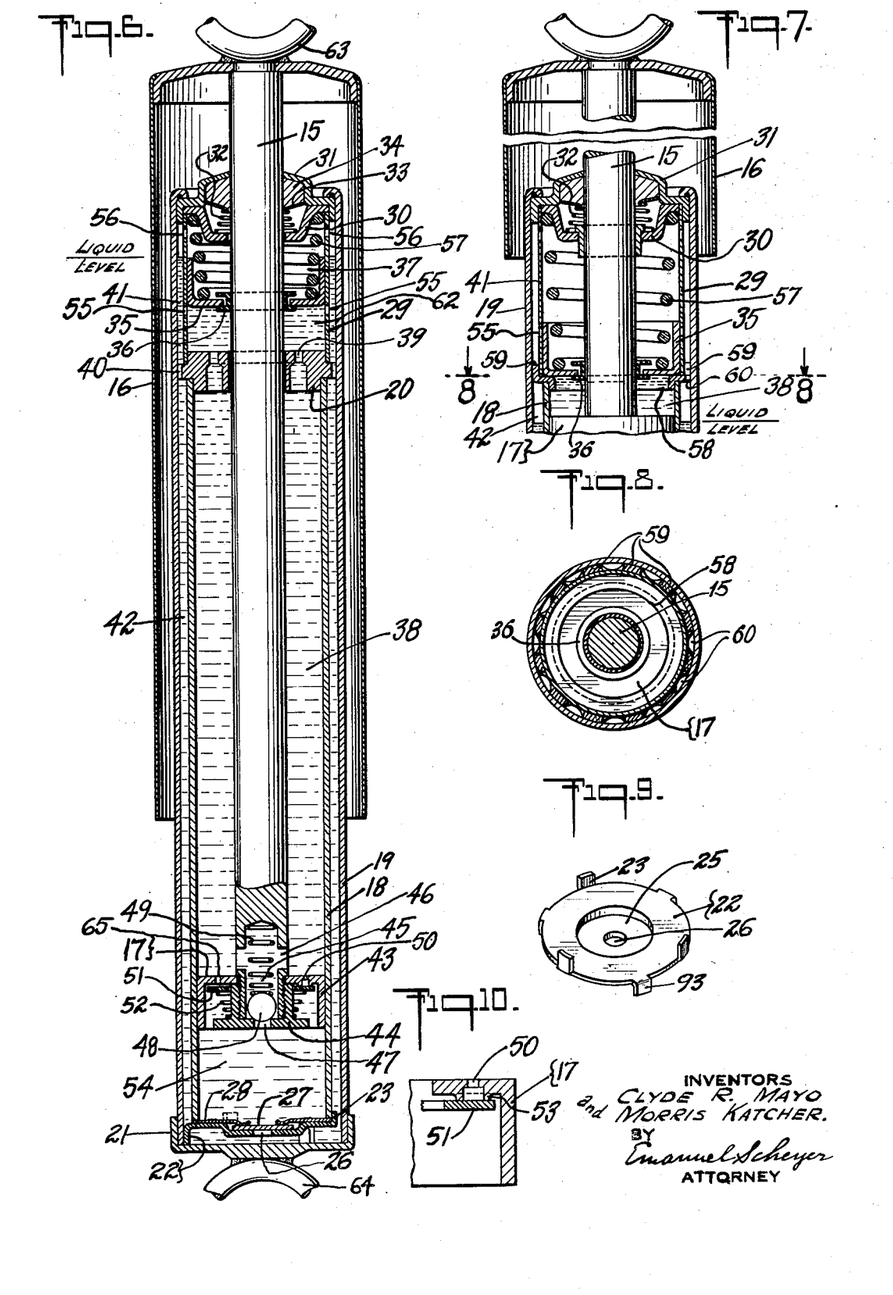
Fig. 6 is a vertical section to a larger scale with the shock absorber largely telescoped.
Fig. 7 is a partial vertical section showing a modified mounting for the cylinders and piston rod, the piston rod being largely withdrawn and the main piston in outward position in the main cylinder.
Fig. 8 is a section taken along the line 8—8 of Fig. 7.
Fig. 9 is a perspective of the closure of the bottom of the main cylinder.
Fig. 10 is a partial section to an enlarged scale of the valve plate and main piston, the valve spring being omitted.

Referring to Figs. 1–10, the piston rod 15 is adapted at its upper end to be attached to the frame of the vehicle. Fixed to piston rod 15 near its upper end is a cylindrical shield 16. Fixed to the lower end of rod 15 is the piston denoted in its entirety by the numeral 17. Piston 17 operates in main cylinder 18. Surrounding and concentric with main cylinder 18 is reservoir cylinder 19. Cylinders 18 and 19 are kept in spaced relation by spacer 20. The lower end of cylinder 19 is closed by a cap 21 which is fixed to it and is adapted to be fastened to a wheel support. Inside of cap 21 is a spacer 22 which is at the bottom of main cylinder 18 and acts to hold it concentric with reservoir cylinder 19. As seen in Fig. 9, spacer 22 is provided with upstanding lugs 23 and 93 which come between cylinders 18 and 19 and keep the cylinders concentric. The downstanding lugs 93 keep the bottom of cylinder 18 a distance above cap 21. The center of spacer 22 is provided with a depression 25 having a hole 26. A valve disc 27 is nested in depression 25 and pressed down therein by plate spring 28 gripped between the bottom of cylinder 18 and spacer 22.

Figures 1, 2, 3, 4, 5:
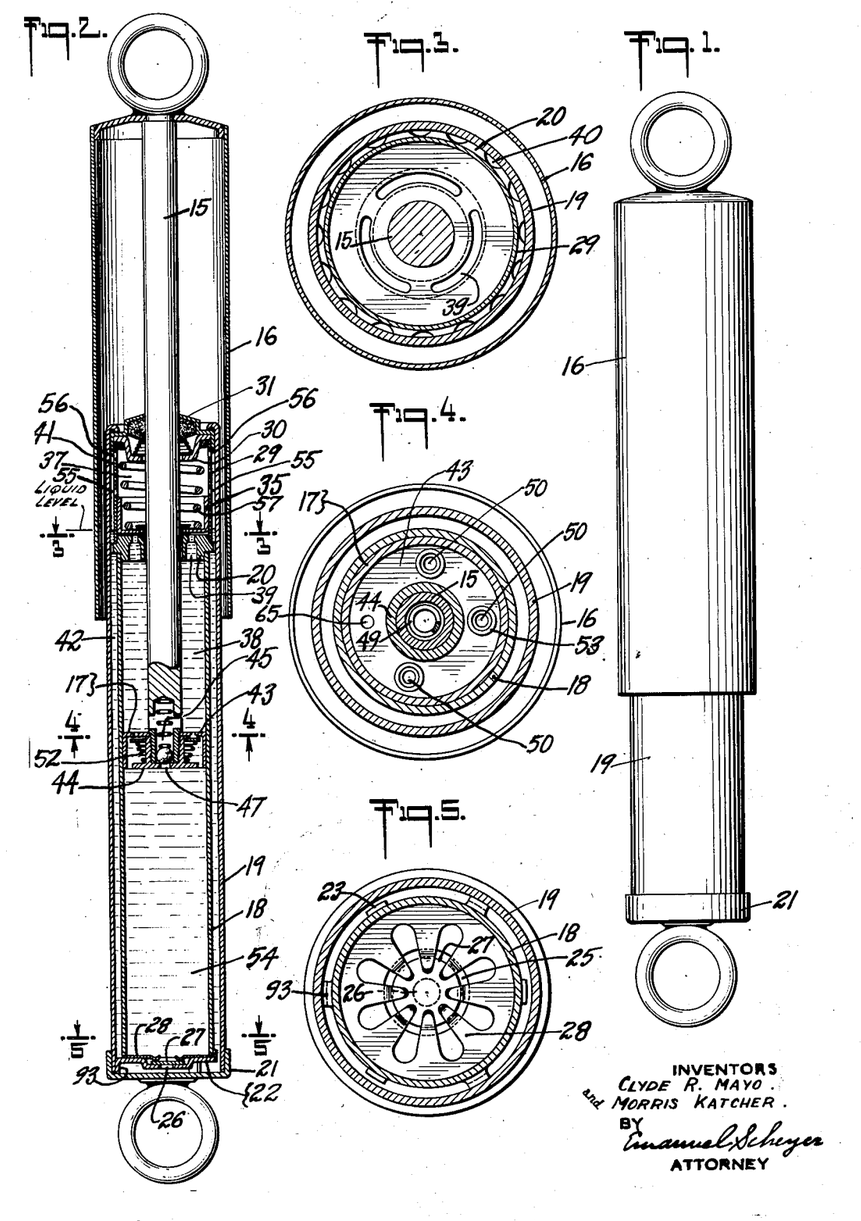
Fig. 1 is an elevation of the shock absorber in not quite fully telescoped condition, the compensating piston being in axial alignment with the main piston.
Fig. 2 is a vertical section with the shock absorber partially telescoped, the compensating piston being nevertheless against its stop, as is the case, because of leakage, when the shock absorber is idle for a sufficient length of time.
Fig. 3 is a section taken along 3—3 of Fig. 2 which is just below the compensating piston.
Fig. 4 is a section taken along the line 4—4 of Fig. 2.
Fig. 5 is a section taken along the line 5—5 of Fig. 2.

Compensating cylinder 29 is set on top of spacer 20. A cup-shaped closure 30 is set on top of cylinder 29. On top of closure 30 is set a retainer 31, the upper edge of reservoir cylinder 19 being crimped over retainer 31, thereby holding all parts tightly together. The edges of retainer 31 are turned down over the outside of cylinder 29 to act as a spacer between cylinders 19 and 29. A spring 32 in closure 30 forces plate 33 against packing material 34 to prevent leakage along piston rod 15.

Compensating piston 35 is slidably mounted in compensating cylinder 29. It is also slidably mounted on piston rod 15 through the intermediacy of channel-shaped synthetic rubber packing ring 36. The hole in the bottom of piston 35, through which piston rod 15 passes, is larger than the external diameter of the web of ring 36. The web of ring 36 has a sliding fit on piston rod 15. When fluid pressure forces the lower flange of ring 36 up against the bottom wall of piston 35, leakage of fluid into space 37 above said piston will be almost completely prevented. Binding of compensating piston 35 on rod 15, should any eccentricity be present, will be prevented because the opening in the bottom of the piston is larger than the outside diameter of the web of ring 36.

Fluid is free to flow through ports 39 in spacer 20 when forced up from the space or chamber 38 below spacer 20 and above main piston 17. Free communication for fluid is also provided by ports 40 between lower reservoir chamber 42 and upper reservoir chamber 41. Ports 55 are provided in compensating cylinder 29 at a predetermined distance above spacer 20 and at a still higher elevation are other ports 56. These ports provide communication between chamber 41 and compensating cylinder 29. A relatively powerful spring 57 normally holds piston 35 down against stop or spacer 20.

The piston assembly 17 consists of a piston cup 43 held against a shoulder on rod 15 by the nut 44. The piston contains valves for controlling the flow of fluid in either direction. Rod 15 has an axial passage 45 which opens at its lower end into chamber 54 below the piston and into radial passage 46 and through the latter into chamber 38 above the piston. The bottom of passage 45 is covered by nut 44 having an opening 47 into chamber 54. Ball 48 is held down by spring 49 on nut 44 over opening 47 providing thereby a check valve permitting flow through the piston from chamber 54 to chamber 38 but not in the reverse direction. There are three openings 50, Figs. 4 and 10, in piston cup 43 for connecting chambers 38 and 54. These openings are unequally spaced circumferentially around the longitudinal axis of rod 15 so that the force acting through said openings to push down the covering valve plate 51 from the openings will act unequally against spring 52 which acts equally all around the plate to push said plate up against said openings. Each opening 50 is provided with a downwardly projecting boss 53 which has a good surface for sealing when plate 51 is in contact with it. Said bosses also provide pivot points when plate 51 is pushed from first one then another of the bosses. Openings 50 are enlarged at their lower end to provide a larger working force against plate 51 than would occur from their smaller upper end. The enlargement of the openings also helps to provide a reduced resistance to flow by plate 51 as said plate opens. In addition to controlled openings 50 in piston cup 43, there is a free opening or port 65.

Figs. 7 and 8 show a spacer 58 of a form modified from that of spacer 20 of Figs. 2 and 6. It consists of a ring having an upturned flange 59 with notches 60 in its periphery. Flange 59 serves to hold compensating cylinder 29 in spaced relation with reservoir cylinder 19, notches 60 affording communication for fluid between upper reservoir chamber 41 and lower reservoir chamber 42. Downwardly projecting flange 61 maintains main cylinder 18 in its relative position to the other adjacent cylinders.

In normal operation, chambers 38 and 54 are filled with hydraulic fluid. When the main piston 17 is near the upper end of its stroke, as is the case, Fig. 7, upon a large recoil of the vehicle springs, not shown, chamber 41 is empty and chamber 42 is partly full with compensating piston 35 resting on spacer 20. When the vehicle springs are compressed, as when the vehicle strikes a bump in the road, main piston 17 moves inward to near the bottom of cylinder 18 as shown in Fig. 6. Because of the added length of piston rod 15 now in chamber 38, more hydraulic liquid is displaced by it than when piston 17 is near the top of said chamber as in Fig. 7. Therefore when piston 17 is down, as in Fig. 6, chambers 38 and 54 are filled with liquid, reservoir chamber 41 is largely filled and compensating piston 35 is lifted, against the pressure of spring 57, off spacer 20 by liquid entering space 62 between them. As piston 17 is moved down into cylinder 18, compensating piston 35 is lifted up from spacer 20 by the flow of liquid through ports 39. Compensating piston 35 rises only until it uncovers port 55 in compensating cylinder 29. Once this happens, the additional fluid, forced into space 62 by the entrance of more of piston rod 15 into chamber 38, passes through ports 55 into reservoir chamber 41. Ports 55 are provided to keep down the length of compensating cylinder 29 by limiting the travel of compensating piston 35. This is necessary when the distance available between the places of attachment 63 and 64 of the shock absorber requires it.

The spring 57, pushing down on compensating piston 35, produces a pressure in the hydraulic fluid in chambers 38 and 54. If piston rod 15 is not moving there is no pressure drop across the piston 17 and the pressures in chambers 38 and 54 are equalized through port 65. When the piston rod 15 is moved fluid must flow through the piston valves and port 65 causing a pressure differential between chambers 38 and 54. The pressure in chamber 38 is determined by the spring force on the compensating piston 35 and is therefore nearly constant. The pressure in chamber 54 rises when the piston rod 15 moves downward and falls when said rod moves up. To compensate for the volume of piston rod 15 as it reciprocates, the combined volumes of chambers 38 and 54 must increase and decrease as the rod moves down or up or provision must be made to let fluid move to and from reservoir chambers 41 and 42. Instead, the action of the compensating piston 35 is used to change the total volume of chambers 38 and 54 to compensate for the volume of piston rod 15. When piston rod 15 moves down, compensating piston 35 moves up to allow for the volume of rod 15 that comes into chamber 38. When piston rod 15 moves up, compensating piston 35 moves down to fill in the volume vacated by rod 15. When piston rod 15 moves down farther than a predetermined amount, compensating piston 35 is moved up to clear ports 55 which allow the aditional volume of displaced fluid to pass into chamber 41. When piston rod 15 moves up more than a predetermined amount compensating piston 35 is moved down until it rests on spacer 20. Once piston 35 reaches spacer 20, the pressure said piston exerts, because of spring 57, on the fluid in chambers 38 and 54 will disappear. This makes it possible for fluid to enter chamber 54 around check valve plate 27 to fill in any volume vacated by further upward movement of the rod.

The action of piston valves 48 and 51 is as follows: During the upward movement of piston 17, the pressure in chamber 38 is greater than in chamber 54. At low speed upward, the fluid will pass through free opening 65. At higher speeds upward, the pressure difference between chambers 38 and 54 will be built up to the point where openings 50 will be uncovered, some openings 50 more than others, permitting an increase of fluid flow and thereby preventing the pressure in chamber 38 from rising too rapidly. At still higher speeds upward, the other openings 50 will be successively more uncovered as the pressure becomes high enough to overcome the spring induced pressure of plate 51 against bosses 53. It is thus seen that fluid is permitted to pass the piston in proportion to the speed and travel of the blow received by the shock absorber. Our shock absorber produces a greater damping effect by permitting more fluid to pass the piston by increasing the area of opening through it as the intensity of the blow is increased than would be the case if there were a fixed area of opening. As the velocity of the main piston is increased, the rate of flow of liquid through said piston increases. This would normally increase the pressure in chamber 38, but by the action of plate 51 to free openings 50 to a greater extent as the rate of flow is increased, this increase in pressure can be regulated as desired.

By changing the size of opening 65, or of any of openings 50 or the amount of force on each boss 53 by the relative spacing of openings 50, or by changing the strength of spring 52, or by changing the area of the openings through said bosses, Fig. 10, it is possible to obtain a large range of damping effect. By proper balancing of these items, a uniform resistance to the flow of fluid through the piston may be obtained for different velocities of said piston.

If the upward speed of piston 17 is faster than a predetermined amount, the relief of pressure effected by the flow of fluid through piston 17 may be insufficient to prevent a sufficient pressure from developing in chamber 38 to push compensating piston 35 upward against its spring 57. The normal motion of piston 35 is downward when piston 17 rises. When, however, piston 35 is forced upward, as just noted, fluid will be sucked past check valve 27 to supply fluid for filling up the space produced between piston 35 and spacer 20. If piston 35 should be pushed above ports 55, fluid will pass into chambers 41 and 42.

On the downward movement of piston rod 15, pressure in chamber 54 is greater than in chamber 38. At low speeds the fluid will pass through free opening 65. At higher speeds the pressure difference will become greater until opening 47 is freed by the pushing back of ball valve 48 against the pressure of its spring 49.

The sealing means 36 between compensating piston 35 and rod 15 is not entirely proof against leakage. Because of this compensating piston 35 will move down to spacer 20, as shown in Fig. 2, due to slow leakage past sealing means 36 when the shock absorber is idle for a sufficiently long period. The first stroke of piston 17 in either direction will make the shock absorber effective again. If after such a period, piston rod 15 moves down, compensating piston 35 will move up as usual. If, however, rod 15 moves up first, compensating piston 35 will be unable to move down because it already is in contact with spacer 20. The needed fluid then will enter chambers 38 and 54 via check valve 27 at the bottom of chamber 54. Compensating piston 35 will lift off spacer 20 and become effective on the next down stroke of piston 17 because of the added fluid.

Should too much fluid leak past sealing means 36 into the space 37 above compensating piston 35, said fluid can escape into reservoir chamber 41 through ports 56.

In Figs. 11–14, the compensating piston 71 is to one side of main piston 17 instead of being in axial alignment with it as in Figs. 1–7. In the construction of the latter figures because of the limited space between places of attachment 63 and 64, when the compensating piston rose to a height which was not sufficient to compensate for the added volume of the piston rod resulting from a long downward stroke, ports 55 were uncovered. This allowed the excess fluid to pass into reservoir chamber 41. In the construction shown in Figs. 11–14, because the compensating piston 71 and compensating chambers 67 and 68, and reservoir chamber 69 are to one side of the main piston 17 and cylinder 70, the volume of fluid displacing compensating piston 71 can be large enough to compensate for the volume of the piston rod for the entire downward stroke of said rod.

Piston 17, which is constructed the same as the one shown in Fig. 6, operates in main cylinder 70. Adjacent to cylinder 70 is compensating cylinder 66. Casing 72 surrounds cylinders 70 and 71 in spaced relation, giving rise to reservoir chamber 69. Cylinders 66 and 71, and casing 69 are mounted in liquid tight relation upon bottom casting 73 and are capped at the top by casting 74. Casing 72 extends up past casting 74 and is capped by casting 76, the latter serving as a guide for piston rod 15. A suitable packing gland 77 is provided about rod 15 to prevent leakage of fluid from the shock absorber. To permit the return to reservoir chamber 69 of whatever fluid that is dragged into space 78 above casting 74, a passage 79 is provided through said casting. In addition, a passage 80 is provided in casting 74, which passage places chamber 81 in main cylinder 70 in communication with compensating chamber 67.

At the bottom of compensating chamber 68 is located a check valve denoted in its entirety by the numeral 82. Check valve 82 comprises a casting 83 in the form of an inverted cup, having an opening 86 at its top, which is closed from below by valve plate 85. Spring 84 holds plate 85 up against the casting 83. Passage 87, in casting 73, places the interior of casting 83 in communication with chamber 88 in main cylinder 70. Compensating piston 71 is movably mounted in compensating cylinder 66. Spring 90, of relatively great strength compared to the resistance of piston valves 48 and 51, Fig. 6, normally holds compensating piston 71 up against casting 74 at the top of chamber 67. A port 91 in compensating cylinder 66 at its bottom provides communication between chambers 68 and 69.

Figures 11, 12, 13, 14:
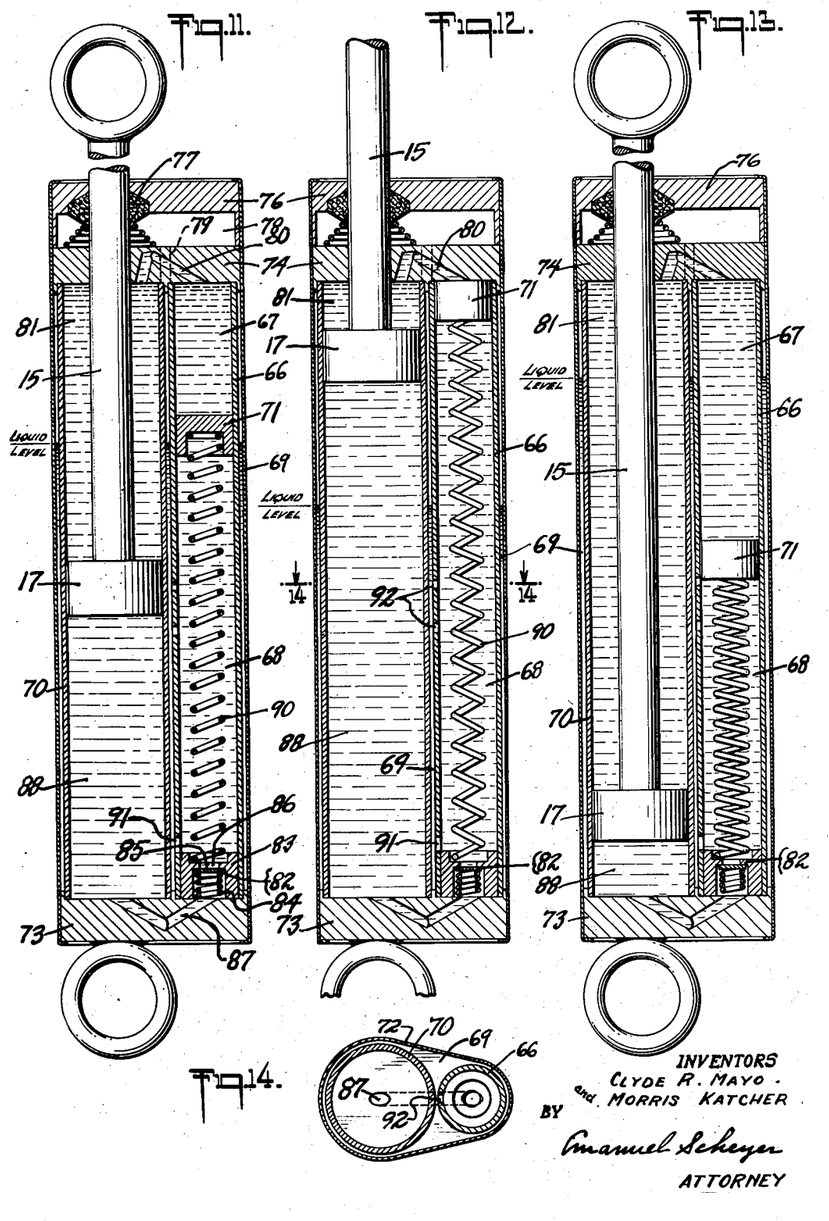
Fig. 11 is a vertical section of a modified form of the shock absorber in which the compensating piston is to one side of the main piston. The shock absorber is shown in partially telescoped position.
Fig. 12 is a vertical section of the shock absorber of Fig. 11 shown substantially fully extended.
Fig. 13 is a vertical section showing the shock absorber of Fig. 11 substantially fully telescoped.
Fig. 14 is a section taken along the line 14—14 of Fig. 11.

When piston rod 15 is moved up from its midposition, as shown in Fig. 11, to its uppermost position, as shown in Fig. 12, the volume of fluid displaced in chamber 81 is less than that of the volume created in chamber 88. To make up for this difference, compensating piston 71 moves up under the influence of its spring 90 to force fluid into chamber 88 via chamber 81 and the ports, not shown, in piston 17.

As piston 17 and rod 15 move down from its position of Fig. 12 to the position shown in Fig. 13, the fluid in chamber 88 passes through the ports in piston 17 into chamber 81. Because of the increased volume occupied by rod 15, there is not room in chamber 81 for all the fluid forced out of chamber 88 into chamber 81. The excess fluid accordingly flows through passage 80 into chamber 67 forcing compensating piston 71 down.

The liquid level in the reservoir chamber 69 falls as in Fig. 12 when the liquid flows into chamber 68 as the piston 71 rises. As seen in Fig. 13, the liquid level rises when piston 71 falls. The air in reservoir chamber 69 above the liquid is compressed and expanded as the level rises and falls. The pressure in chamber 69 does not vary much from atmospheric pressure because the change in volume is only a small part of the total volume of the air space.

Under normal conditions of construction there will be some leakage around compensating piston 71. If the vehicle be inoperative for a long enough period of time, compensating piston 71 will be moved up by spring 90 as leakage occurs until said piston reaches casting or cap 74 at the top of chamber 67. When the shock absorber is next used, the fluid lost by the leakage will be replaced as follows: the first upward movement of the piston rod will cause liquid to enter chamber 88 through check valve 82. Compensating piston 71 is stopped by casting 74 being prevented thereby from causing high pressure in main cylinder 70. The amount of fluid that enters will depend on the amount of upward movement of piston rod 15. If a complete upward stroke be made by piston 17, compensating piston 71 will move to the position shown for it in Fig. 13 upon the next complete downward stroke of piston 17. If the upward stroke of the piston rod does not cause piston 17 to reach its extreme upper position, a corresponding less amount of fluid will be sucked into cylinder 70. Now when the piston rod moves down, compensating piston 71 will be at a lesser distance down than shown for it in Fig. 13. It may, say, be down to the position shown for it in Fig. 11.

When the vehicle on which the shock absorber is mounted is driven for a long time on a smooth road, the oscillation of the piston rod 15 will be limited to a small fraction of its possible total stroke. The oscillation of compensating piston 71 will be correspondingly small. As leakage takes place past piston 71, said piston will gradually move toward its upper stop which is the casting 74, because no liquid can enter chamber 67 to replace the loss until piston 71 arrives at said stop. Then when there is a relatively large downward stroke of piston rod 15, fluid will be forced into chamber 67, Fig. 13.

The compensating spring 90 is strong enough so that with ordinary motions, the pressure resulting from the upward motion of piston 17 opposes but does not overcome the upward pressure in chamber 67 caused by piston 71. If the upward velocity of piston rod 15 were high enough relatively to the strength of spring 90 or of said spring were too weak, the upward motion of the piston 17 would cause piston 71 to be forced down against spring 90, fluid being sucked in at the same time through check valve 82 to compensate both for the volume evacuated by piston rod 15 in leaving chamber 81 and the increased volume of chamber 67. Openings 92 in cylinder 66 will permit the return of fluid to reservoir chamber 69 when piston 71 is forced far enough down to clear them. Once the fluid escapes through openings 92, there is no further downward motion of piston 71. This also serves to prevent the jamming of spring 90 so that all its coils are closed. When this occurs, if holes 92 were omitted, any further introduction of fluid into chamber 67 upon sudden downward motion of piston 17 would subject the shock absorber to excessive stress.

The strength of the compensating spring 90, influences the retarding force of main piston 17. The force pushing compensating piston 71 upward will be less at the top of its stroke than at the bottom, because with said piston at the top, compression spring 90 is extended, and with said spring at the bottom the spring is compressed. The maximum damping action on main piston 17 is, therefore, less when the compensating piston is near the top of its stroke. The time when maximum damping is needed is on the rebound. The upward motion of piston 17 on which a high degree of damping is required will always be preceded by a large downward displacement of said piston. This downward displacement of piston 17, because of the entrance of piston rod 15 into chamber 81 at the same time moves compensating piston 71 down, resulting in the compression of spring 90. Thus on the rebound, that is when piston 17 jumps up, spring 90 exerts its maximum upward pressure resulting in the exertion of the maximum damping force on said piston.

To a great extent, the features discussed above for the construction of Figs. 11-14 also apply to the construction in which the compensating piston is in alignment with the main piston, Figs. 1-10. With the latter construction, the stroke of the compensating piston allows for part only of the fluid displaced by the piston rod, an overflow being provided to take care of the full stroke of the piston rod 15. In Figs. 11-14, the compensating piston provides for the full stroke of the piston rod 15, the overflow 92 being provided for other reasons as noted above.

The relatively strong pressure of their springs against compensating pistons 35 and 71 as noted before, produces a high pressure in chambers 38 and 54, Fig. 2, and in chambers 81 and 88, Fig. 12. This will tend to push piston rod 15 out when it is in any position other than its extreme upper position. That this is so is because the area exposed to downward fluid pressure is less on the top of piston 17, than the area exposed to upward pressure against the bottom of said piston. The presence of piston rod 15 at the upper surface of piston 17 prevents an area equal to the cross section of the piston from being exposed to the fluid. Because the area of piston rod 15 is small to that of piston 17, this unbalanced force is not objectionable. The larger diameter of piston 17 and hence that of the main cylinders 18 and 70 is made, the less will be the effect of said unbalanced force. By using a larger diameter for piston 17 and the main cylinders, the volume of liquid required to pass the piston will be increased requiring larger fluid passages. Larger passages are easier to manufacture and less critical to tolerance.

Ports 55 in compensating cylinder 29 and ports 92 in compensating cylinder 66, besides limiting the travel of compensating pistons 35 and 71, respectively, serve as overflows from the compensating cylinders to the reservoirs. If such overflows were not provided, jolts which would be severe enough to draw fluid from the reservoirs through check valves 27 and 82 would soon have fluid in the main and compensating cylinders with no place to go when the piston rod was moved down into the main cylinders. For a jolt to be severe enough to draw in fluid into the main cylinders through said check valves, said jolt must develop sufficient resistance to passage of fluid through the main pistons to overcome the pressure of springs 57 and 90 against compensating pistons 35 and 71.

The term "cylinder" as used in the claims is not necessarily limited to a cylindrical body, but is intended to be broad enough to cover other forms having corresponding pistons.

We claim:

1. In a shock absorber of the fluid-flow type the combination of a plurality of tubular members arranged to provide a main cylinder portion, a compensating cylinder portion and a reservoir around said cylinder portions, a main piston and piston rod therefor reciprocably mounted in the main cylinder portion, said rod extending through one end of the main cylinder portion, a passageway connecting the main cylinder portion and the compensating cylinder portion substantially at said end, a compensating piston reciprocably mounted in the compensating cylinder portion, a spring pressing the compensating piston toward said end, a passage connecting the opposite end of the main cylinder portion with the reservoir, a check valve permitting flow through the said latter passage to the main cylinder portion but not from said main cylinder portion, and overflow means, in communication with the main cylinder and the reservoir, permitting escape of fluid to the reservoir when a predetermined fluid pressure is exceeded in the main cylinder.

2. In a shock absorber of the fluid-flow type, the combination of a main cylinder and a compensating cylinder communicating with the main cylinder for interflow of fluid, a main piston and a piston rod therefor reciprocably mounted in the main cylinder, said rod extending through one end of the main cylinder, means in the main piston permitting flow through the main piston in both directions, said means including valve elements permitting said flow in both directions but each element in itself permitting flow through the main piston in one direction only, a compensating piston reciprocably mounted in the compensating cylinder, and a spring pressing the compensating piston to exert pressure in the main cylinder in a direction to oppose the outward motion of the main piston and piston rod, the pressure exerted by the compensating piston being normally in substantial excess of the resistance offered by the flow of fluid through the main piston when the latter is moved in an outward direction in the main cylinder.

3. In a shock absorber of the fluid-flow type, the combination of tubular members arranged to provide a main cylinder portion, a compensating cylinder portion and a reservoir surrounding said portions, a main piston and piston rod therefor reciprocably mounted in the main cylinder portion, said rod extending through one end of the main cylinder portion, a passageway connecting the main cylinder portion and the compensating cylinder portion substantially at said end, means in the main piston permitting flow through the main piston in both directions, said means including valve elements permitting said flow in both directions but each element in itself permitting flow through the main piston in one direction only, a compensating piston reciprocably mounted in the compensating cylinder portion, a spring pressing the compensating piston toward said end, a passage connecting the opposite end of the main cylinder portion with the reservoir, a check valve permitting the flow of fluid through said latter passage to the main cylinder portion but not from said main cylinder portion, and overflow means in communication with the main cylinder and the reservoir, permitting escape of fluid to the reservoir when a predetermined fluid pressure is exceeded in the main cylinder.

4. In a shock absorber of the fluid-flow type, the combination of a main cylinder, a main piston and a piston rod therefor reciprocably mounted in the main cylinder, said rod extending through one end of the main cylinder, means in the main piston, including valve elements, permitting flow through the main piston in both directions, at least one valve element permitting flow through the main piston in each direction, the relative resistance to the flow of fluid through the elements being such that said resistance is greater for fluid passing through the piston in a direction away from said end, a compensating cylinder, a passageway connecting the cylinders substantially at said end, a compensating piston reciprocably mounted in the compensating cylinder, and a spring pressing the compensating piston toward said passage.

5. In a shock absorber of the fluid-flow type, the combination of a main cylinder, a main piston and a piston rod therefor reciprocably mounted in the main cylinder, said rod extending through one end of the main cylinder, means in the main piston, including valve elements, permitting flow through the main piston in both directions, but each valve element in itself permitting flow in one direction only, at least one element permitting flow through the main piston in each direction, a compensating cylinder, a passageway connecting the cylinders substantially at said end, a compensating piston reciprocably mounted in the compensating cylinder, and a spring pressing the compensating piston to exert pressure in the main cylinder in a direction to oppose the outward motion of the main piston and piston rod, the pressure exerted by the compensating piston being normally in substantial excess to the resistance offered by the flow of fluid through the main piston when the latter is moved in an outward direction in the main cylinder.

6. In a shock absorber of the fluid-flow type, the combination of a main cylinder and a compensating cylinder communicating with the main cylinder for interflow of fluid, a main piston and a piston rod therefor reciprocably mounted in the main cylinder, said rod extending through one end of the main cylinder, means in the main piston, including valve elements, permitting flow through the main piston in both directions, but each valve element in itself permitting flow through the main piston in one direction only, there being a plurality of valve elements permitting flow through the piston away from said end, said latter elements opening up to a greater extent successively for the flow of fluid through them in accordance with the increase in pressure developed by the piston during the motion of said piston toward said end, a compensating piston reciprocably mounted in the compensating cylinder, and a spring urging the compensating piston to exert pressure in the main cylinder in a direction to oppose the outward motion of the main piston and the piston rod, the pressure exerted by the compensating piston being normally in excess of the resistance offered by the flow of fluid through the main piston as the latter valve elements open up successively as the main piston is moved in an outward direction in the main cylinder.

7. In a shock absorber for use on a spring-mounted vehicle, a cylinder, a piston and piston rod reciprocably mounted in the cylinder, the cylinder and piston rod being so connected to the vehicle that, upon compression of the vehicle springs, the piston rod and piston travel in one direction in the cylinder, and in the opposite direction therein upon recoil of said springs, and a plurality of valve elements on the piston permitting flow through the piston in both directions, but each element in itself permitting flow through the piston in one direction only, there being a plurality of valve elements permitting flow through the piston away from the end of the cylinder toward which the piston moves upon its recoil, said latter elements opening up to a greater extent with resilient resistance, successively for the flow of fluid through them in accordance with the increase in speed of the piston toward said latter end upon recoil.

8. In a shock absorber of the fluid-flow type the combination of a main cylinder, a compensating cylinder, a reservoir, a main piston and piston rod therefor reciprocably mounted in the main cylinder, said rod extending through one end of the main cylinder, a passageway connecting the main cylinder and the compensating cylinder substantially at said end, a compensating piston reciprocably mounted in the compensating cylinder, a spring urging the compensating piston toward said end, a passageway connecting the main cylinder with the reservoir substantially at the opposite end of the main cylinder, a check valve permitting flow through the latter passageway to the main cylinder but not from the main cylinder, check valve means permitting flow through the main piston in one direction, other check valve means permitting flow through the main piston in the opposite direction, and overflow means in communication with the main cylinder and the reservoir, permitting escape of fluid to the reservoir when a predetermined fluid pressure is exceeded in the main cylinder.

9. In a shock absorber of the fluid-flow type the combination of a main cylinder, a compensating cylinder in substantial axial alignment with the main cylinder, a main piston and piston rod therefor reciprocably mounted in the main cylinder, said rod extending through one end of the main cylinder and passing through and out of the compensating cylinder, a passageway at said end connecting the main and compensating cylinders, a compensating piston in the compensating cylinder slidably mounted on said rod, a spring urging the compensating piston toward said end, a reservoir, a passageway connecting the main cylinder with the reservoir substantially at the opposite end of the main cylinder, a check valve permitting flow through the latter passageway to the main cylinder but not from the main cylinder, the main piston being constructed to permit flow at a restricted rate by it in both directions, and overflow means in communication with the main cylinder and the reservoir, permitting escape of fluid to the reservoir when a predetermined fluid pressure is exceeded in the main cylinder.

10. In a shock absorber of the fluid-flow type the combination of a main cylinder, a compensating cylinder located to the side of the main cylinder, a main piston and piston rod therefor reciprocably mounted in the main cylinder, said rod extending through one end of the main cylinder, the compensating cylinder communicating with the main cylinder substantially at said end, a compensating piston in the compensating cylinder, a spring urging the compensating piston toward said end to exert pressure in the main cylinder in a direction to oppose the motion of the main piston toward said end, a reservoir, a passageway between the opposite end of the main cylinder and the reservoir, a check valve permitting flow through the passageway to the main cylinder but not from the main cylinder, the main piston being constructed to permit flow at a restricted rate by it in both directions, and overflow means in communication with the main cylinder and the reservoir, permitting escape of fluid to the reservoir when a predetermined fluid pressure is exceeded in the main cylinder.

11. In a shock absorber of the fluid-flow type the combination of a main cylinder, a compensating cylinder in substantial axial alignment with the main cylinder, a main piston and piston rod therefor reciprocably mounted in the main cylinder, said rod extending through one end of the main cylinder and passing through and out of the compensating cylinder, a passageway substantially at said end connecting the main and compensating cylinders, a compensating piston in the compensating cylinder slidably mounted on said rod, a spring urging the compensating piston toward said end, a reservoir, a passageway connecting the main cylinder with the reservoir substantially at the opposite end of the main cylinder, and a check valve permitting flow through the latter passageway to the main cylinder but not from the main cylinder, the main piston being constructed to permit flow at a restricted rate by it in both directions, said compensating cylinder being provided with a port located at a substantial axial distance from the end of the main cylinder through which the piston rod passes, said port connecting the compensating cylinder with the reservoir, flow from the main cylinder via the compensating cylinder through said port to the reservoir being blocked by the compensating piston when the compensating piston is less than the axial distance of said port from that end of the main piston through which the piston rod passes, the entrance of the rod into the main cylinder forcing the compensating piston away from said latter end until the compensating piston is moved sufficiently to clear the port for flow through said port from the compensating cylinder to the reservoir.

12. In a shock absorber of the fluid-flow type the combination of a main cylinder, a compensating cylinder located to the side of the main cylinder, a main piston and piston rod therefor reciprocably mounted in the main cylinder, said rod extending through one end of the main cylinder, the compensating cylinder communicating with the main cylinder substantially at said end, a compensating piston in the compensating cylinder, a spring urging the compensating piston toward said end to exert pressure in the main cylinder in a direction to oppose the motion of the main piston toward said end, a reservoir, a passageway between the opposite end of the main cylinder and the reservoir, a check valve permitting flow through the passageway to the main cylinder but not from the main cylinder, the main piston being constructed to permit flow at a restricted rate by it in both directions, said compensating cylinder being provided with a port located a substantial axial distance from the end of the main cylinder through which the piston passes, said port connecting the compensating cylinder with the reservoir, flow from the main cylinder via the compensating cylinder through said port to the reservoir being blocked by the compensating piston when the compensating piston is less than said axial distance of said port, the entrance of the rod into the main cylinder forcing the compensating piston away from said latter end until the compensating piston is moved sufficiently to clear the port for flow through said port from the compensating cylinder to the reservoir.

13. In a shock absorber of the fluid-flow type the combination of a main cylinder, a compensating cylinder in substantial axial alignment with the main cylinder, a casing surrounding said cylinders providing a reservoir between said cylinders and the casing, a main piston and piston rod therefor reciprocably mounted in the main cylinder, said rod extending through one end of the main cylinder and passing through and out of the compensating cylinder, a passageway at said end connecting the main and compensating cylinders, a compensating piston in the compensating cylinder slidably mounted on said rod, a spring urging the compensating piston toward said end, a passageway connecting the main cylinder with the reservoir substantially at the opposite end of the main cylinder from said one end, a check valve permitting flow through the latter passageway to the main cylinder but not from the main cylinder, the main piston being constructed to permit flow at a restricted rate by it in both directions, and overflow means in communication with the main cylinder and the reservoir, permitting escape of fluid to the reservoir when a predetermined pressure is exceeded in the main cylinder.

14. In a shock absorber of the fluid-flow type the combination of a main cylinder, a compensating cylinder located to the side of the main cylinder, a casing surrounding said cylinders providing a reservoir between said cylinders and the casing, a main piston and piston rod therefor reciprocably mounted in the main cylinder, said rod extending through one end of the main cylinder, the compensating cylinder communicating through an opening with the main cylinder substantially at said end, a compensating piston in the compensating cylinder, a spring urging the compensating piston toward said opening to exert pressure in the main cylinder in a direction to oppose the motion of the main piston toward said end, a passageway between the opposite end of the main cylinder and the reservoir, a check valve permitting flow through the latter passageway to the main cylinder but not from the main cylinder, the main piston being constructed to permit flow at a restricted rate by it in both directions, and overflow means in communication with the main cylinder and the reservoir permitting escape of fluid to the reservoir when a predetermined fluid pressure is exceeded in the main cylinder.

15. A shock absorber as claimed in claim 9 in which the compensating cylinder is provided with a port located on the side of the compensating piston away from the main cylinder, said port connecting the compensating cylinder with the reservoir, flow from the main cylinder via the compensating cylinder through said port to the reservoir being blocked by compensating piston except for leakage past the compensating piston.

16. In a shock absorber of the fluid-flow type the combination of a main cylinder, a compensating cylinder located to the side of the main cylinder, an end piece forming a closure for the main cylinder extending laterally to form an end closure also for the compensating cylinder, a chamber located axially beyond said end piece, said piece forming one end of the chamber, a second end piece spaced axially from the first end piece forming the other and far end of said chamber, a passageway provided in said first end piece for fluid communication between the main and compensating cylinders, a main piston and piston rod therefor reciprocably mounted in the main cylinder, said rod extending slidably through both of said end pieces, a spring urging the compensating piston toward the first of the end pieces to exert pressure through said passageway in the main cylinder in a direction to oppose the motion of the main piston toward said end, a reservoir, a passageway between the opposite end of the main cylinder and the reservoir, a check valve permitting flow through the latter passageway to the main cylinder but not from the main cylinder, the main piston being constructed to permit flow at a restricted rate by it in both directions, said first end being provided with a port connecting said chamber with the reservoir for the flow to the reservoir of leakage to the chamber from the main cylinder along the piston rod, and overflow means in communication with the main cylinder and the reservoir, permitting escape of fluid to the reservoir when a predetermined pressure is exceeded in the main cylinder.

17. In a shock absorber of the fluid-flow type the combination of a main cylinder, a compensating cylinder in substantial axial alignment with the main cylinder, a main piston and piston rod therefor reciprocably mounted in the main cylinder, said rod extending through one end of the main cylinder and passing through and out of the compensating cylinder, a passageway at said end connecting the main and compensating cylinders, a compensating piston in the compensating cylinder slidably mounted on said rod, and a spring urging the compensating piston toward said end.

18. In a shock absorber of the fluid-flow type, the combination of a main cylinder, a main piston and a piston rod therefor reciprocably mounted in the main cylinder, said rod extending through one end of the main cylinder, means in the main piston, including valve elements, permitting flow through the main piston at one time in one direction and at another time in the opposite direction, depending on the direction of motion of the piston, a compensating clyinder in fluid communication with the main cylinder, a compensating piston reciprocably mounted in the compensating cylinder, and a spring urging the compensating piston to exert fluid pressure in the main cylinder in a direction to oppose the outward motion of the piston rod and main piston, said means in the main piston for permitting flow being constructed to resist in a predetermined manner, the flow of fluid through the main piston in a direction away from said end, the pressure exerted by the compensating piston being normally in substantial excess of the resistance offered by the flow of fluid through the main piston when the latter is moved in an outward direction in the main cylinder.

19. In a shock absorber of the fluid-flow type, the combination of a cylinder, a piston and a piston rod therefor reciprocably mounted in the cylinder, a plurality of valve openings in the piston at different circumferential distances from each other, considering the longitudinal axis of the piston as a center, a tiltably mounted member normally biased for yieldingly closing said openings against flow of fluid through the piston in one direction, a spring reacting against said member for producing its bias, the axis of thrust of said member being substantially coaxial with the longitudinal axis of the piston, said member being tiltably moved against its bias to expose said openings when the piston is moved in the opposite direction with sufficient velocity to cause the flow of fluid through said openings to overcome the pressure of the spring.

CLYDE R. MAYO.
MORRIS KATCHER.

REFERENCES CITED

The following references are of record in the file of this patent:

UNITED STATES PATENTS

| Number | Name | Date |
|---|---|---|
| 1,078,060 | Newman | Nov. 11, 1913 |
| 1,571,788 | Bramlette, Jr. | Feb. 2, 1926 |
| 2,038,032 | Flynn | Apr. 21, 1936 |
| 2,239,112 | Nickelsen | Apr. 22, 1941 |
| 2,355,491 | Whisler, Jr. | Aug. 8, 1944 |
| 2,410,176 | Magrum | Oct. 29, 1946 |

FOREIGN PATENTS

| Number | Country | Date |
|---|---|---|
| 395,410 | Great Britain | Jan. 13, 1933 |